United States Patent [19]

Carroll

[11] 4,160,134
[45] Jul. 3, 1979

[54] DIGITAL SIGNAL LEVEL MEASUREMENT

[75] Inventor: James C. Carroll, Apex, N.C.

[73] Assignee: International Telephone and Telegraph Corporation, Nutley, N.J.

[21] Appl. No.: 827,508

[22] Filed: Aug. 25, 1977

[51] Int. Cl.² .................... H04B 3/46; H03K 13/02
[52] U.S. Cl. .................... 179/175.3 R; 324/99 D; 324/111
[58] Field of Search .............. 179/175.3 R, 175; 324/99 D, 111, 77 F; 340/347 M

[56] References Cited

U.S. PATENT DOCUMENTS

| | | | |
|---|---|---|---|
| 3,478,348 | 11/1969 | Molyneux | 324/111 |
| 3,543,152 | 11/1970 | Niedereder | 324/111 |
| 3,566,397 | 2/1971 | Walton | 324/99 D |
| 3,828,255 | 8/1974 | Schuon | 324/99 D |
| 3,939,459 | 2/1976 | Hoopes | 324/99 D |
| 3,958,178 | 5/1976 | Mueller et al. | 324/99 D |
| 3,999,123 | 12/1976 | Thoener | 324/111 |
| 4,055,733 | 10/1977 | Holsinger et al. | 179/175.3 R |
| 4,058,808 | 11/1977 | Malaviya | 324/111 |

Primary Examiner—Douglas W. Olms
Attorney, Agent, or Firm—John T. O'Halloran; Jeffrey P. Morris

[57] ABSTRACT

An accurate, low cost and stable digital decibel indicating level meter having a wide amplitude and frequency range in decibels is described having a dynamic range of greater than 80 decibels with high decibel linearity over an extended decibel range. A dual slope integration technique minimizes drift and simplifies calibration, and uses a voltage reference which is compared to an exponentially decaying integration voltage such that when a time duration elapses from the beginning of the discharge to the time when the reference and discharge voltages are equal, the time duration is logarithmically proportional to the voltage being measured. A counter is enabled to provide a digital indication of the signal level measured in decibels, which indication is stored in a latch circuit displayed or coupled out.

15 Claims, 5 Drawing Figures

DIGITAL SIGNAL LEVEL MEASUREMENT

BACKGROUND OF THE INVENTION

1. Field of the Invention

The present invention relates generally to digital level measurement circuitry of the decibel indication type and to telecommunication transmission systems requiring precise digital monitoring and measurement in decibels.

The invention also relates to the fields of independent voltage level measurement and to sample and hold logarithmic analog to digital converters.

2. Description of the Prior Art

Measurement of voltages and of changes in power and voltage over wide ranges of amplitude in which the total dynamic range of the parameter, such as voltage, to be measured exceeds the accuracy to which the voltage value must be known, is common in the field of electronics and in telephony related applications. An accurate and low cost digital level measurement instrument is provided by the present invention for measuring in decibels, voltage and/or power changes. By measuring in decibels the ratio either between two amounts of power, $P_1$, and $P_2$, or the ratio of two voltages, $V_1$, and $V_2$, where:

$$db = 10 \log_{10}(P_1/P_2),$$

and $$db = 20 \log_{10}(V_1/V_2),$$

measurements over wide ranges of voltage and/or power variations may be made. In telephony, in two and four-wire switching systems noise levels are required at specified relative levels, referred to as the transmission level. Hence, a zero-transmission-level point (OTLP) is a point in a circuit with the same relative level as the sending terminals, where the sending end terminals of a long distance circuit are considered to be at a point of zero relative level. Signal level and test tones are similarly measured to monitor the performance of carrier terminal and line equipment, voice repeaters, etc. to insure that speech and other data transmissions corresponds to standardized relative levels. Further description of such standardized relative levels appears in Reference Data For Radio Engineers, Sixth Edition, Howard W. Sams Co., Inc., 1975 at 2-1 to 2-3.

Presently available analog measurement techniques are typically accurate to 0.1 decibel over a 10 decibel range with manual switching of an attenuator in ten decibel steps, which serves to range the measurement instrument over its operating span. Such measurement techniques are unsuitable for use with current programably controlled transmission equipment, which requires a digital output indicative of voltage and other electrical parameters measured to 0.01 decibel accuracy, and which can be utilized by data processing and other logic circuitry.

In the known prior art, a linear AC voltage is converted into a digital signal in decibels by the use of a logarithmic amplifier to logarithmically compress the ac signal being measured by the linear ac/dc conversion by a precision rectifier and filter. The resulting dc voltage is then translated into a digital readout proportional to the input signal in decibels by any of a number of well-known analog to digital conversion techniques.

Another technique of the known prior art in converting a linear ac voltage into a digital signal in decibels employs the technique of linear ac amplification of the signal to be measured followed by precision rectification and filtering. The filtered dc output is then logarithmically compressed using the logarithmic characteristics of a diode or one of the junctions of a transistor. A dc voltage is thus obtained which is proportional to the amplitude of the input signal in decibels and which is convertable into a digital signal by any one of a number of analog-to-digital conversion methods.

Both of the above described techniques for providing a digital decibel indication of a linear ac voltage are limited in accuracy by the stability and linearity of the logarithmic characteristic of the semiconductor device performing the conversion. Hence, without careful selection and precise temperature control of such semiconductor device, it is difficult to achieve a linearity better than ± 0.02 decibel over a 10 decibel dynamic range in volume production. Since the desired logarithmic current/voltage characteristic of a semiconductor is affected by other undesirable parameters, semiconductor selection and normalization is required. In the telecommunication field wherein dynamic measurement ranges of 80 db or more are required, both of the aformentioned prior art measurement circuits would be preceded in an actual measurement system with digitally controlled attenuators probably in 10 or 20 decibel steps.

Another known method of the prior art in achieving digital level measurement in decibels utilizes digitally controlled attenuators in a feedback loop whereby the amplitude of the input signal to be measured is adjusted such that after passing through the attenuator and a precision rectifier and filter, the resultant dc voltage is compared with and maintained equal to a reference dc voltage for all input signal values over the dynamic range of the measuring instrument. The attenuation value is thus a decibel representation of the input signal.

The aforedescribed measuring technique of the prior art, while capable of accuracy and linearity better than ±0.02 decibel over a 10 decibel dynamic range in volume production, is expensive due to the high cost of the large number of switchable attenuators required and the detrimental effect the switchable attenuators have on frequency response.

In contradistinction to the aforedescribed systems of the prior art, the present invention provides ±0.001 decibel linearity over a 10 decibel range and ±0.01 decibel linearity over a 20 decibel range without special devices or temperature dependent performance.

SUMMARY OF THE INVENTION

A decibel indicating digital level measurement instrument is provided, wherein a dual slope integration technique minimizes long term drift problems normally associated with timing components and enables simplified calibration. In contradistinction to the constant current source required in known dual slope analog to digital converters for discharging the integration capacitor therein to ground, the present invention utilizes a voltage source to which the exponentially decaying integration capacitor voltage is compared. The present invention requires only attenuators in ten or twenty decibel increments to prescale the input signal to fall within the most accurate range of the analog to digital converter, no other switching being required.

It is therefore an object of the invention to provide a decibel indicating voltage level measuring instrument which is accurate, low cost and has a wide amplitude and frequency range.

Another object of the invention is to provide a db meter capable of indicating in decibels, a voltage level measurement either above or below a reference.

Another object of the invention is to provide a digital decibel indicating level measurement circuit for telecommunications transmission equipment.

Another object of the invention is to provide a sample and hold logarithmic analog to digital converter.

The foregoing and other objects and advantages of the invention will become apparent with reference to the following detailed description of a preferred embodiment and to the drawings wherein:

DESCRIPTION OF THE PREFERRED EMBODIMENT

Figure 1:
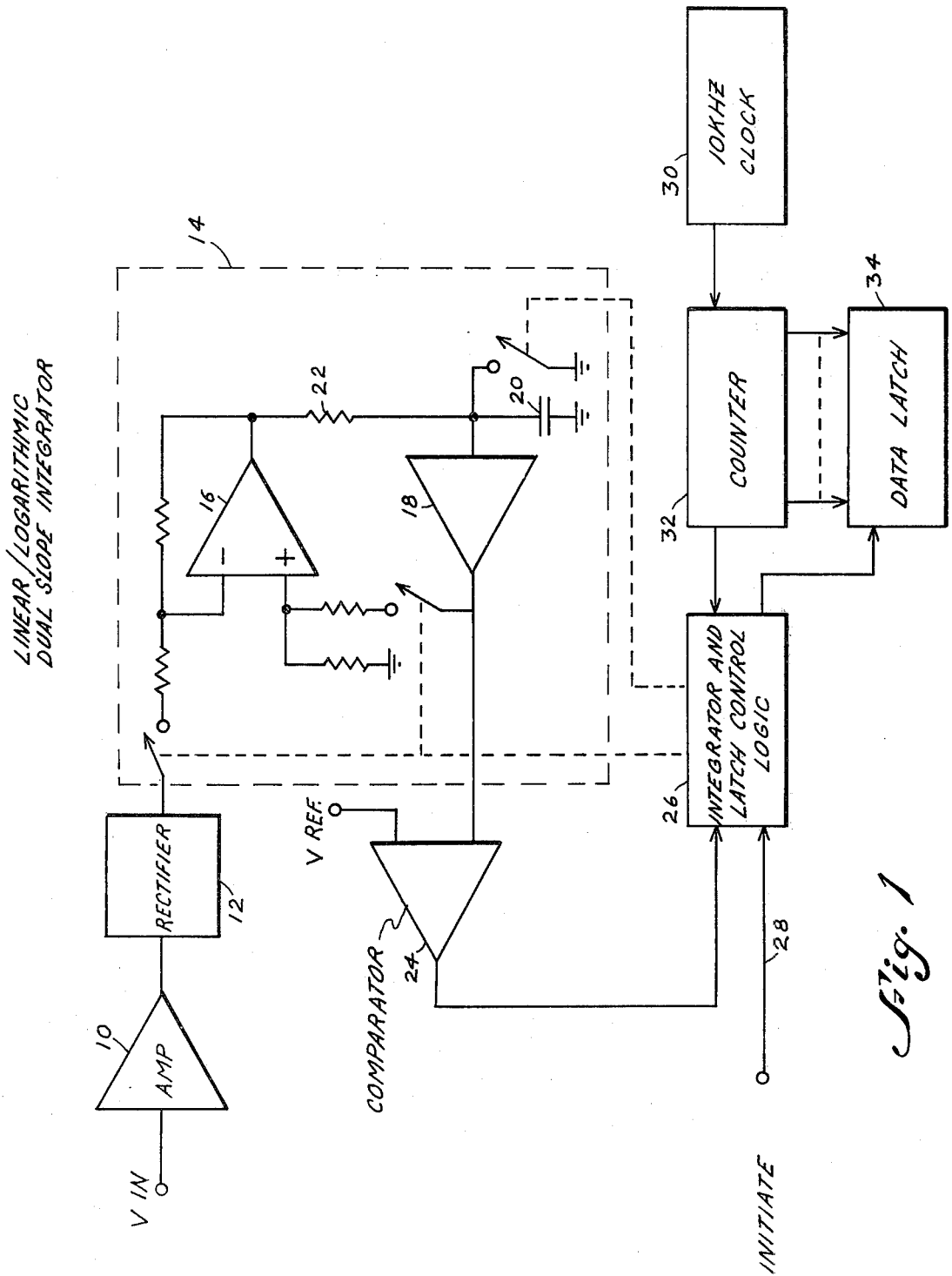
FIG. 1 is a simplified functional block diagram of a digital level measurement circuit in accordance with the present invention.

Referring to FIG. 1, a circuit for measuring an input electrical parameter, such as a sinusoidal input voltage $V_{in}$, which is subject to wide variation in amplitude is illustrated, wherein data in decibels is derived with respect to the input parameter, ie., $V_{in}$. Hence, wherein $V_{in}$ is an incoming signal in a telephone central or local office transmission channel-bank equipment, the signal transmission level is accurately monitored and measured, and an indication of the transmission level in decibels derived.

Input voltage $V_{in}$, which may, by way of example, be a standard 1 kHZ test tone, is amplified by an output buffer amplifier 10, and then is rectified by a precision rectifier 12 to derive a precise negative dc voltage proportional to the RMS value of the input voltage, $V_{in}$, which is preferably sinusoidal. A dual slope linear to logarithmic converter 14, including operational amplifiers 16 and 18 and a time constant circuit including capaciter 20 and resistor 22 converts the rectified negative dc voltage to an exponentially decaying voltage across integration capacitor 20, which is compared to a voltage reference by comparator 24. Upon correspondence of the reference voltage and the exponentially decaying integration voltage at comparator 24, the output of which is coupled to integrator and latch control logic 26, a control command discharges the integration capacitor 20 within dual slope integrator 14 until another measurement command is received at integrator at latch control logic 26 via line 28 to repeat the cycle. A 10 Khz clock 30 is gated ON during measurement intervals only to reduce the possibility of TTL noise interference with other instruments and serves to clock an up-counter 32 which serves to prescale the measured input in 10 or 20 decibels increments to fall within the most accurate range of the converter. A data latch or display 34 stores the output of counter 32 under the control of logic 26 and may include a visual display or an output data bus. While counter 32 may preferably comprise a modulus 1000 counter which upcounts, the logic may be configured to count down thereby deriving readings in db below the reference voltage.

Figure 2:
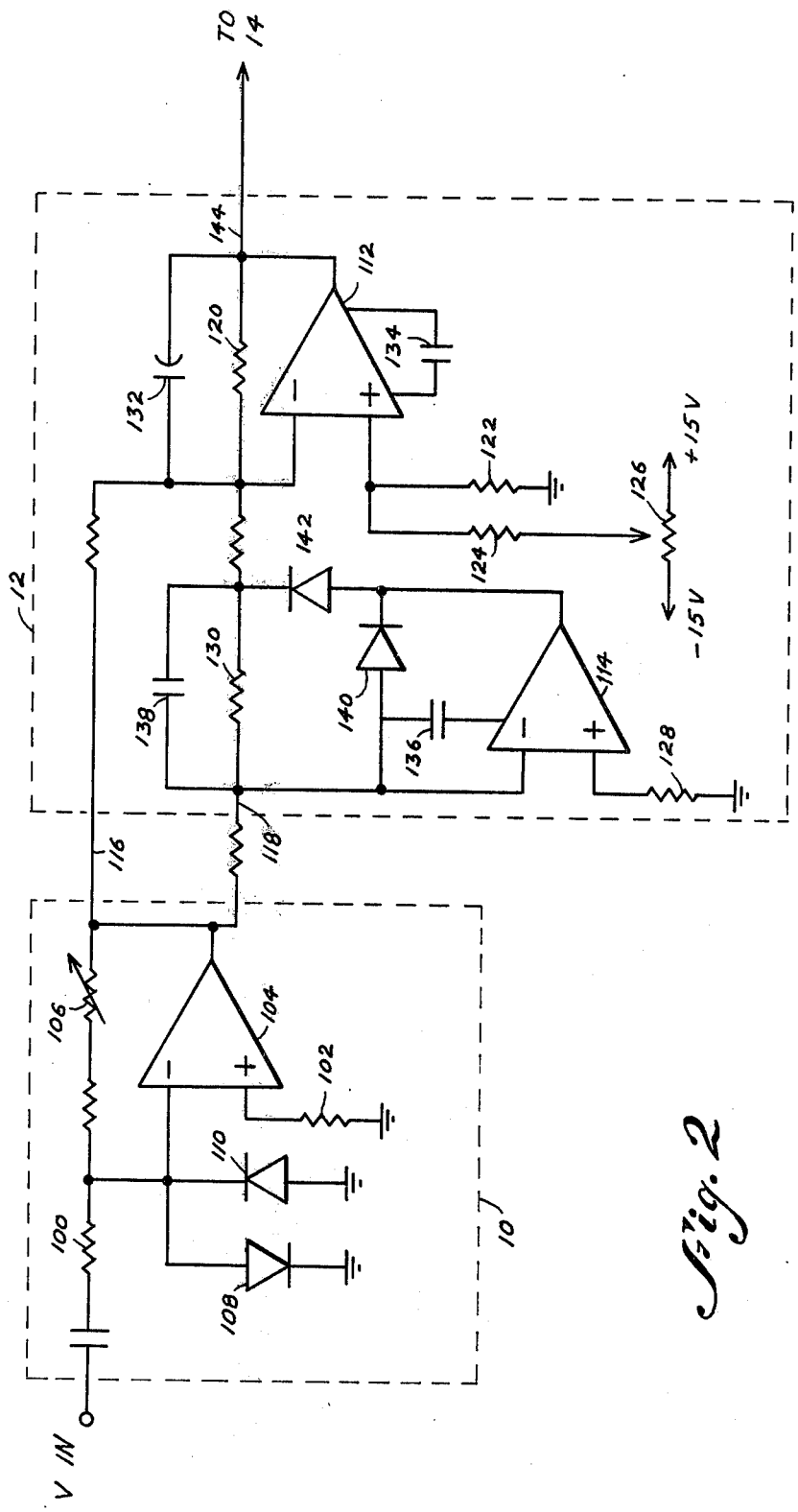
FIG. 2 is a detailed schematic diagram of the input amplifier and rectifier portion of the circuit described with reference to FIG. 1.

Referring now to FIG. 2, a schematic of amplifier 10 and rectifier 12 is illustrated. An input impedance of 100 Kohm is provided by resistors 100 and 102 for the buffer amplifier 104, which has a gain variable from 0 to +6 db by potentiometer 106. Precision rectification is provided by operational amplifiers 112 and 114 for rectification of the output of buffer amplifier 104 which is coupled thereto via lines 116 and 118. A biasing, filter and rectification network for operational amplifier 112 and 114 is provided by resistors 120, 122, 124, 126, 128 and 130, by capacitors 132, 134, 136 and 138, and by diodes 140 and 142. The negative dc voltage output on line 144 is coupled to the linear to logarithmic converter 14. The frequency response of amplifier 10 and rectifier 12 as illustrated is approximately 40 Hz–100 KHz ±0.05 dB.

Figure 3:
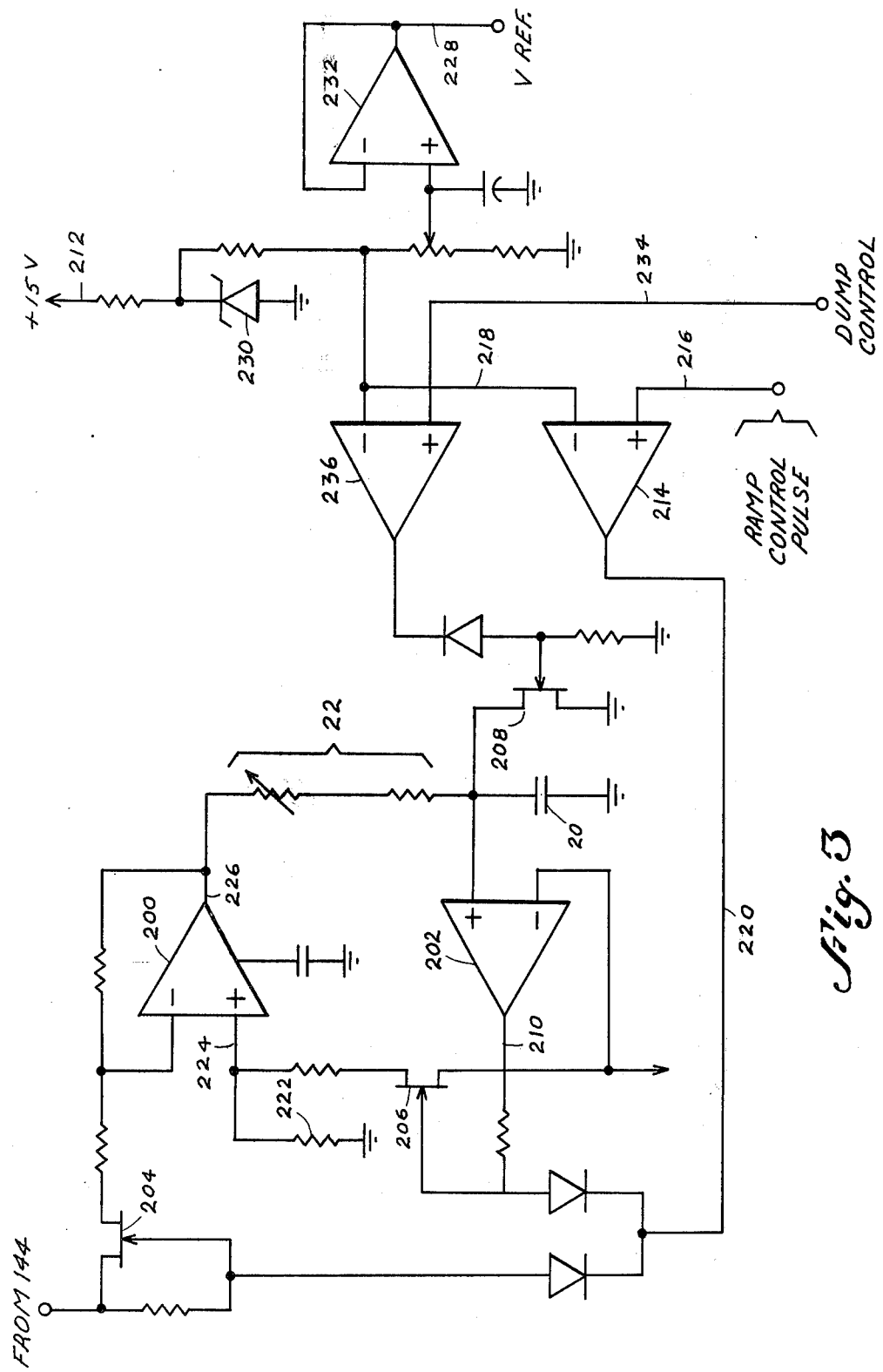
FIG. 3 is a detailed schematic diagram of the linear to logarithmic converter and voltage reference portion of the circuit described with reference to FIG. 1.

Referring now to FIG. 3, the linear to logarithmic converter 14 is described. A dual slope integrator is formed by operational amplifiers 200 and 202, together with associated biasing and filtering resistors and capacitors. The rectified negative dc voltage on line 144 is coupled to an FET 204. When FET's 204 and 206 are turned ON and FET 208 is OFF, a positive going ramp is generated at the output of operational amplifier 202 on line 210, having a rate of change of voltage with time which is proportional to the time constant of resistor 22 and capacitor 20 and to the rectifier 12 output voltage on line 144. Ramp control is provided by a positive 100 millisecond pulse which is coupled to the positive input of an operational amplifier 214 on line 216, and a 1.8 volt voltage source which is coupled to the negative input 218 of amplifier 214, such that a −15 volt to +15 volt voltage swing is derived on line 220 to control FET's 204 and 206, which determines the positive slope integration period. At the end of the 100 millisecond ramp control pulse, FET's 204 and 206 are turned OFF, and operational amplifier 200 becomes a voltage follower with zero volts being coupled through resistor 222 to its positive input 224. Simultaneously, zero volts appears at the output 226 of amplifier 200, hence capacitor 20 discharges exponentially to ground at a rate determined by the time constant of resistor 22 and capacitor 20. When the voltage across capacitor 20 reaches a value equal to a reference voltage $V_{ref}$ on line 228 derived from zener diode 230 and buffer amplifier 232, which equality is determined by a comparator, described with reference to FIG. 5, the time duration transpired from the beginning of the discharge, T, is proportional to the logarithmic of the magnitude of $V_{in}$. Thus, $T = \ln (V_{in})/(V_{Ref})$ when $V_{in} > V_{Ref}$, R is resistor 22 and C is capacitor 20.

At time T, when the voltage across capacitor 20 is equal to $V_{ref}$, the logarithmic conversion is completed and a dump control pulse on line 234 is coupled to the positive input of an operational amplifier 236, which functions as a level translator for the voltage coupled to the negative input thereof, and which, in response to the dump control pulse, turns FET 208 ON, which discharges capacitor 20 until another measurement initiating pulse is received at the integrator and latch control 26 to turn FET 208 OFF and repeat the cycle.

Figure 4:
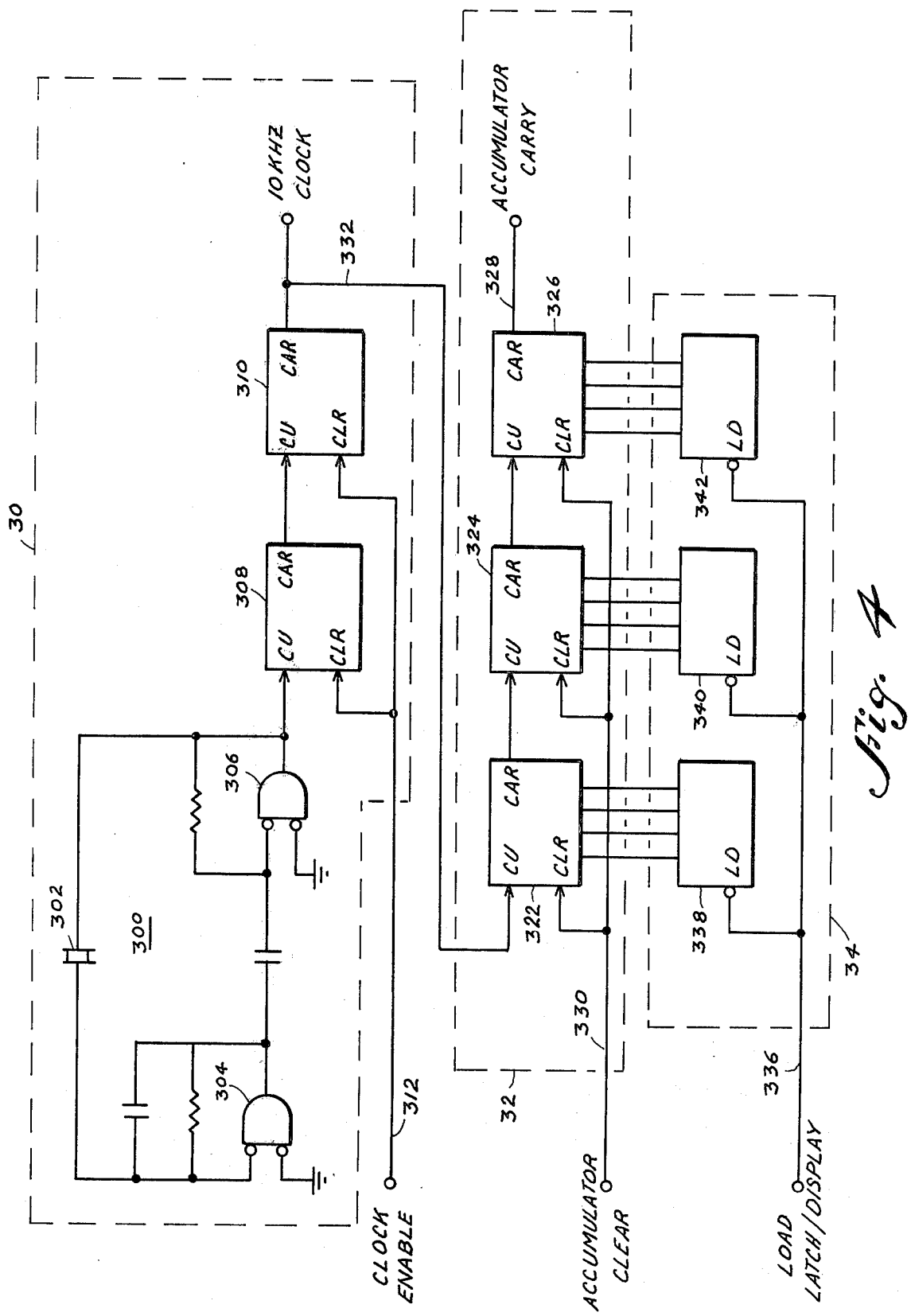
FIG. 4 is a schematic and logic diagram of the clocking, data accumulation and related circuitry described with reference to FIG. 1.
Figure 5:
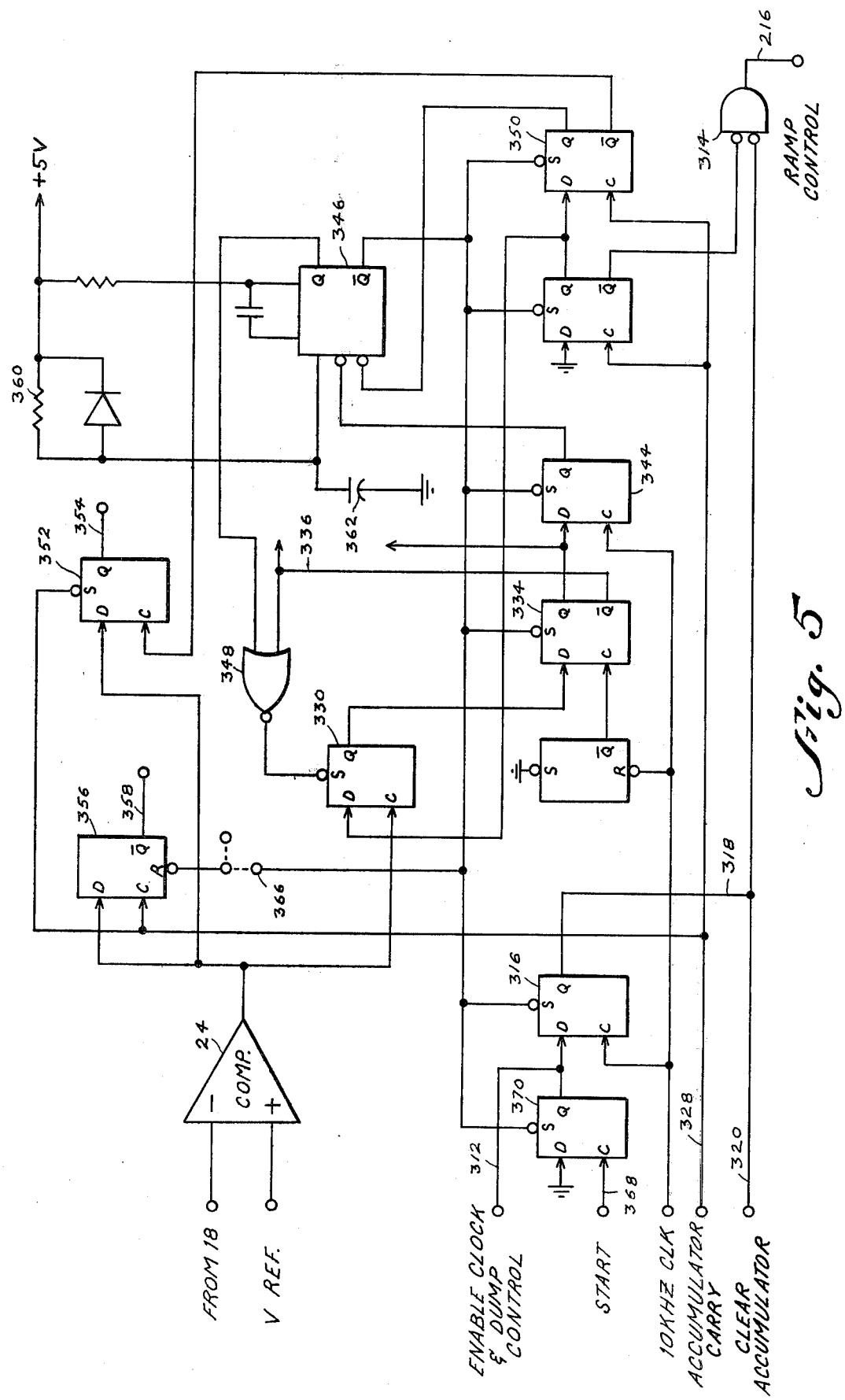
FIG. 5 is a logic diagram of control logic used in the present invention.

Referring now to FIGS. 4 and 5, the clock, accumulator, data latch and related control logic are illustrated. The 10 KHz clock 30 which is gated ON only during measurement intervals is comprised of a 1 MHz oscillator 300, which includes a crystal 302 which is coupled across NOR gates 304 and 306; and a pair of decade dividers 308 and 310. Upon receipt of a clock enable pulse on line 312 in response to a measure command signal, a start ramp control pulse is coupled via line 216 from NOR gate 314 to operational amplifier 214 of the dual slope integrator as aforedescribed, and flip-flop 316 via line 318 removes the clear accumulator condition via line 320 from accumulators 322, 324, and 326, at which time the counter 32 up-counts from an initial count of 000 until a count of 999 is reached. Upon reaching a count of 999, the carry pulse from accumulator 326 on line 328 initiates the discharge of integration capacitor 20 via ramp control logic 314 and sets flip-flop 330 to respond to the next positive going transition from the comparator 24 which is indicative that the voltage across integration capacitor 20 has decayed to $V_{ref}$.

The 10 KHz clock pulses on line 332 continue up-counting the accumulator until receipt of the comparator 24 output transition occurs, at which time flip-flop 334 generates a load pulse on line 336 for the data latch 34, which is comprised of low power Schotky storage registers 338, 340 and 342, which storage registers retain the count reached by accumulators 332, 324 and 326 when the comparator 24 output transition occurred. After the load pulse on line 336 is generated by flip-flop 334, flip-flop 344 triggers a one-shot circuit 346, which produces a system reinitialization pulse in preparation for the next measurement, which is NOR'ed at NOR gate 348 with the load pulse on line 336 to reset flip-flop 330.

In the event that a second accumulator carry pulse appears on line 328, indicative of the condition that a positive going transition at the output of comparator 24 did not occur before accumulator 32 reached a count of 999 during the discharge period of integration capacitor 20, then flip-flop 350 is clocked to trigger one-shot 346, which produces a reinitialization pulse which is coupled to flip-flop 330 through NOR gate 348 to reinitialize the system. Simultaneously, flip-flop 352 is set at a logical low to provide an indication on line 354 of an overrange condition.

In the event that the first accumulator carry pulse on line 328 occurs when the output of comparator 24 is a logical zero, an underrange condition exists and flip-flop 356 is set at a logical low while the output on line 358 indicates the underrange condition. System initialization is provided by triggering one-shot 346 after each coupling of power through an RC network comprised of resistor 360 and capacitor 362.

A visual indication of underrange or overrange may be obtained by LED's or other like devices at terminals 364 and 366, which visual indication consists of pulses at a rate corresponding to the start command input on line 368 applied to flip-flop 370.

While the present invention has been described in connection with a preferred embodiment thereof, it is to be understood that additional embodiments, modifications and applications which will become obvious to us skilled in the art are included in the spirit and scope of the invention as set forth by the claims appended hereto. By way of example, by replacing the input amplifier 10 and rectifier 12 with wide-band equivalents, a performance capability at radio frequencies may be achieved. Further, by charging integration capacitor 20 via a sampling gate, a sample and hold logarithmic analog to digital conversion is achieved which maybe utilized in conjunction with a higher frequency clock and a low value of capacitor 20 enables analog to digital conversion accurate to ±0.01 dB to be obtained at a sampling rate of 1 KHz.

I claim:

1. An instrument for measuring the level of an input ac electrical signal comprising:
   rectification means having said ac input signal coupled thereto for deriving a dc voltage having an amplitude which is substantially linearly proportional to the RMS value of said input ac signal;
   means for providing a reference voltage;
   integration means having said dc voltage coupled thereto to derive an exponentially decaying integration voltage wherein said integration means comprises a dual slope integrator for generating a ramp voltage having a rate of change of voltage with respect to time which is substantially linearly proportional to the output of said rectification means;
   means for comparing said reference voltage and said exponentially decaying integration voltage and for generating a comparator output signal when said compared reference voltage and said integration voltage are equal; and
   logic means for converting said comparator output into a digital indication in decibels of the level of said input ac electrical signal.

2. An instrument in accordance with claim 1 wherein said integration means includes a integration capacitor through which said ramp voltage is discharged; and
   means associated with said logic means for generating a control pulse which is determinative of the integration period.

3. An instrument in accordance with claim 2 wherein the time duration from the initiation of said discharge through said integration capacitor to the time when said discharging voltage is equal to said reference voltage is proportional to the logarithm of the magnitude of said input electrical signal.

4. An instrument in accordance with claim 3 wherein said input electrical signal is an ac voltage.

5. An instrument in accordance with claim 4 wherein said ac voltage is a sinusoidal test tone.

6. An instrument in accordance with claim 4 wherein said dc voltage derived from said rectification means is proportional to the RMS value of said sinusoidal input voltage.

7. An instrument in accordance with claim 4 further comprising:
   buffer amplifier means having said input voltage coupled thereto and having an output coupled to said rectification means.

8. An instrument in accordance with claim 4 further comprising:
   data latch means having said digital indication in decibels from said logic means coupled thereto and clocked by said count for storing said digital indication.

9. An instrument in accordance with claim 8 further including:

visual display means having said stored data from said data latch means coupled thereto for deriving a visual display of said data.

10. In a PCM telephone communications system for deriving a plurality of channels of multiplexed PCM data from a plurality of telephone subscriber lines associated with each of said channels coupled thereto for retransmission, a level measurement circuit for measuring the level of an input ac signal comprising:

rectification means having said ac input signal coupled thereto for deriving a dc voltage having an amplitude which is linearly proportional to the RMS value of said input ac signal;

means for providing a reference voltage;

integration means having said dc voltage coupled thereto to derive an exponentially decaying integration voltage, and wherein said integration means comprises:

a dual slope integrator for generating a ramp voltage having a rate of change of voltage with respect to time which is substantially linearly proportional to the output of said rectification means;

means for comparing said reference voltage and said exponentially decaying integration voltage and for generating a comparator output signal when said compared reference voltage and said integration voltage are equal; and logic means for converting said comparator output into a digital indication in decibels of the level of said input electrical signal.

11. In a PCM telephone communications system in accordance with claim 10 an input signal level measurement circuit wherein said integration means includes:

a dual slope integrator for generating a ramp voltage having a rate of change of voltage with respect to time which is proportional to a time constant circuit and to the output of said rectification means; and wherein the time duration from the initiation of said discharge through said integration capacitor to the time when said discharging voltage is equal to said reference voltage is proportional to the logarithm of the magnitude of said input electrical signal.

12. In a PCM telephone communications system in accordance with claim 11 an input signal level measurement circuit wherein said input electrical signal is an ac voltage.

13. In a PCM telephone communications system in accordance with claim 12, an input signal level measurement circuit wherein said ac voltage is a sinusoidal test tone.

14. In a PCM telephone communications system in accordance with claim 12, an input signal level measurement circuit further comprising:

buffer amplifier means having said input voltage coupled thereto and having an output coupled to said rectification means.

15. In a PCM telephone communications system in accordance with claim 14, an input signal level measurement circuit further comprising:

data latch means having said digital indication in decibels from said logic means coupled thereto and clocked by said count for storing said digital indication.

* * * * *